United States Patent
LaVigne et al.

(10) Patent No.: US 10,892,992 B2
(45) Date of Patent: Jan. 12, 2021

(54) LOAD BALANCING

(71) Applicant: Hewlett Packard Enterprise Development LP, Houston, TX (US)

(72) Inventors: Bruce E. LaVigne, Roseville, CA (US); Don Fedyk, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/310,684

(22) PCT Filed: Jul. 1, 2016

(86) PCT No.: PCT/US2016/040614
§ 371 (c)(1),
(2) Date: Dec. 17, 2018

(87) PCT Pub. No.: WO2018/004639
PCT Pub. Date: Jan. 4, 2018

(65) Prior Publication Data
US 2019/0327174 A1 Oct. 24, 2019

(51) Int. Cl.
*H04L 12/803* (2013.01)
*H04L 12/707* (2013.01)
*H04L 12/801* (2013.01)
*H04L 12/825* (2013.01)
*H04L 12/891* (2013.01)
*H04W 28/08* (2009.01)

(52) U.S. Cl.
CPC ............ *H04L 47/125* (2013.01); *H04L 45/22* (2013.01); *H04L 47/11* (2013.01); *H04L 47/25* (2013.01); *H04L 47/41* (2013.01); *H04W 28/08* (2013.01)

(58) Field of Classification Search
None
See application file for complete search history.

(56) References Cited

U.S. PATENT DOCUMENTS 8,014,278 B1  9/2011  Subramanian et al.
8,499,093 B2  7/2013  Grosser et al.
(Continued)

FOREIGN PATENT DOCUMENTS

WO    WO-2015072709    5/2015

OTHER PUBLICATIONS

"Setting a New Standard for Network Efficiency with VCS Fabric Multilayer, Multipathing Capabilities," Dec. 7, 2012, pp. 1-8, White Paper, Brocade Communications Systems, Inc.
(Continued)

*Primary Examiner* — Michael J Moore, Jr.
(74) *Attorney, Agent, or Firm* — Hewlett Packard Enterprise Patent Department

(57) ABSTRACT

Example implementations relate to load balancing network traffic flows in a network switching device. According to an example, in a network switching device, a method to load balance network traffic flows across links of the device includes identifying a flow of the network traffic flows as an elephant flow. In response to identifying the flow as an elephant flow, the method collects remote utilization information for the flow. The method recomputes a path for the flow based on local utilization information and the collected remote utilization information and sends the flow along the recomputed path.

19 Claims, 4 Drawing Sheets

(56) References Cited

U.S. PATENT DOCUMENTS

| | | | |
|---|---|---|---|
| 8,717,888 B2 | 5/2014 | Sankar et al. | |
| 9,185,015 B2* | 11/2015 | Matthews | H04L 43/0888 |
| 9,426,072 B2* | 8/2016 | Ratzin | G06F 11/34 |
| 10,097,465 B2* | 10/2018 | Sreeramoju | H04L 47/125 |
| 10,218,629 B1* | 2/2019 | An | H04L 47/283 |
| 10,505,849 B1* | 12/2019 | Iny | H04L 47/31 |
| 2012/0257507 A1 | 10/2012 | Sato et al. | |
| 2014/0237118 A1* | 8/2014 | Matthews | H04L 47/2441 709/226 |
| 2015/0071076 A1* | 3/2015 | Izhak-Ratzin | H04L 47/805 370/236 |
| 2015/0124825 A1 | 5/2015 | Dharmapurikar et al. | |
| 2015/0163142 A1* | 6/2015 | Pettit | H04L 49/3018 370/230 |
| 2015/0341247 A1 | 11/2015 | Curtis et al. | |
| 2016/0105343 A1 | 4/2016 | Janarthanan et al. | |
| 2017/0163522 A1* | 6/2017 | Sreeramoju | H04L 45/24 |
| 2017/0163539 A1* | 6/2017 | Sreeramoju | H04L 47/125 |
| 2018/0034724 A1* | 2/2018 | Fedyk | H04L 45/24 |
| 2019/0123974 A1* | 4/2019 | Georgios | G06N 3/0454 |

OTHER PUBLICATIONS

Aaron Balchunas, "Redundancy and Load Balancing," Jul. 19, 2014, pp. 1-17, v1.31, routeralley.com.

International Searching Authority, The International Search Report and the Written Opinion, dated Mar. 29, 2017, 13 Pgs.

Mohammad Alizadeh et. al, CONGA: Distributed Congestion-Aware Load Balancing for Datacenters, SigComm '14, Aug. 17, 2014, 12 Pgs.

Peng Wang, Hong Xu, Expeditus: Distributed Load Balancing with Global Congestion Information in Data Center Networks, CoNext 2014, Dec. 2, 2014, 3 Pgs. http://www.cs.cityu.edu.hk/~h.

Benson et al., "Network Traffic Characteristics of Data Centers in the Wild", IMC'10, Nov. 1-3, 2010, 14 pages.

* cited by examiner

LOAD BALANCING

BACKGROUND

Load balancing of network traffic can be performed in various ways. The link aggregation protocol (LAG) operates at layer 2 of the network and can enable a network switching device to combine multiple links into a single logical link that can be used for network flows. This can ensure that a single switch link is not overloaded with traffic from the network flows while other links remain lightly used. Equal-cost multipath routing (ECMP) operates at layer 3 of the network and can identify multiple alternative paths (e.g., next hop destinations) for a given network flow.

DETAILED DESCRIPTION

Figure 1A:
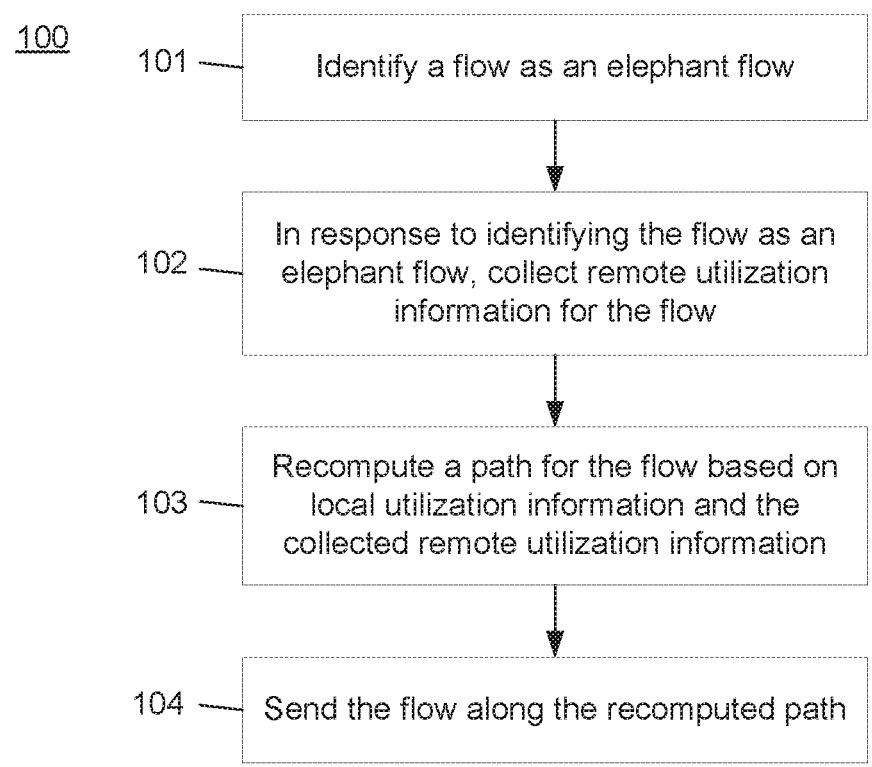
FIG. 1a illustrates a flow chart of an example method for load balancing network traffic, according to an example.

Network load balancing is especially useful in data center networks, where dynamically changing high bandwidth traffic patterns should be handled efficiently with high performance and low cost. Static load balancing techniques are often inadequate due to server virtualization, high-bandwidth application loads, and the changing availability of network links. As a result, static techniques can fail to provide adequate responsiveness to the dynamically changing load on the network. Dynamic load balancing can achieve better results by considering local link utilization information and rebalancing flows across the links when local link utilization information indicates that one or more links are overloaded. However, sometimes a dynamic load balancing decision made based on local link utilization information creates problems in the network, such as in subsequent next hop switching devices.

According to examples described herein, a new load balancing technique referred to herein as "Active Load Balancing" (ALB) can make better local load balancing decisions for the network as a whole. ALB works by considering remote link utilization information in addition to the local link utilization information. By considering remote link utilization information ALB can make a load balancing decision that benefits both the local device (for which the network flows are being balanced) as well as the remote devices that will receive the network flows (and thus be impacted by how they are balanced). Because obtaining remote link utilization information incurs a resource and bandwidth cost, which can result in significant network load and/or stale information, ALB obtains remote link utilization information which can be applied mainly for network flows expected to have a large impact on the network. Such flows are referred to herein as "elephant flows". Because there is much less information being obtained, ALB may obtain this information more regularly, which can result in the information being more current and appropriate for making a load balancing decision for the particular flow at any given moment. Thus, by focusing on elephant flows, ALB can make appropriate, network-wide load balancing decisions for the fewer, more impactful flows while not incurring the overhead of obtaining remote link utilization information for all flows passing through the local switching device.

An example method employing these techniques load balances network traffic flows across links of a switching device. The method includes identifying a flow as an elephant flow. In response to identifying the flow as an elephant flow, the method collects remote utilization information for the flow. A path (e.g., link, next-hop device) for the flow is recomputed based on local utilization information and the collected remote utilization information. Then, the flow is sent along the recomputed path.

An example network switching device employing these techniques includes a flow byte counter table to count bytes passing through the network switching device on a per-flow basis. The flow byte counter table may employ counters or meters that monitor the size of the flow over time. The device also includes an elephant flow learning module to monitor a flow that surpasses a threshold (e.g., number of bytes, number of bytes during a given time period, etc.). The device includes both a remote utilization information collector to collect remote utilization information from a remote device, and a local utilization counter to collect local utilization information of links of the network switching device. The device also includes a load balancer to recompute a path (e.g., link, next-hop device) of the flow based on the remote utilization information and the local utilization information upon detecting a flowlet boundary in the flow. Details of this example method and device will be described more fully in the description below.

Figure 1B:
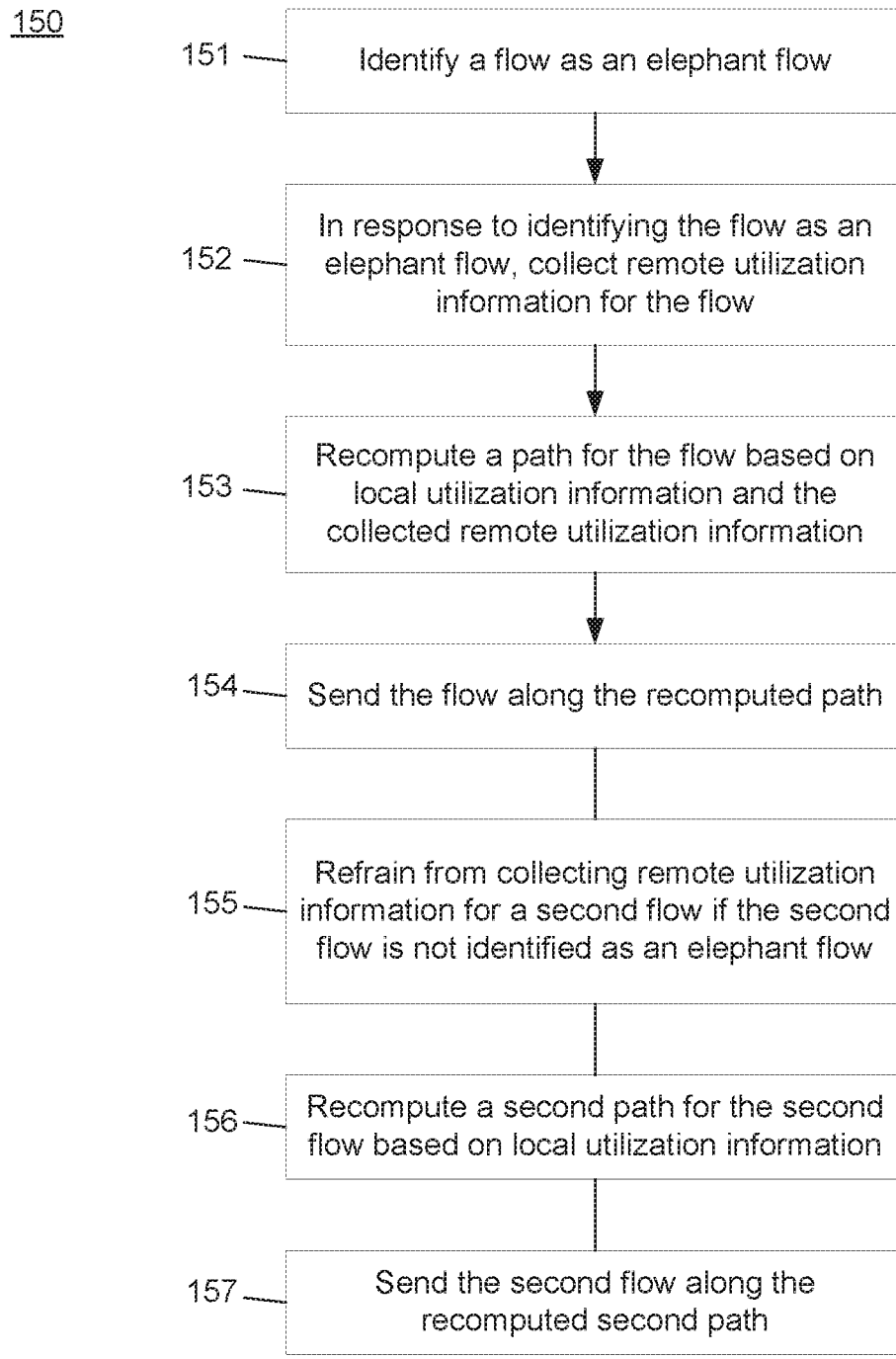
FIG. 1b illustrates a flow chart of an example method for load balancing network traffic, according to an example.

FIGS. 1(a) and 1(b) illustrate methods to load balance network traffic flows, according to an example. Methods 100 and 150 may be performed by a computing device, such as a network switching device. Aspects of the method may be implemented by processing resources of the network switching device.

Figure 2:
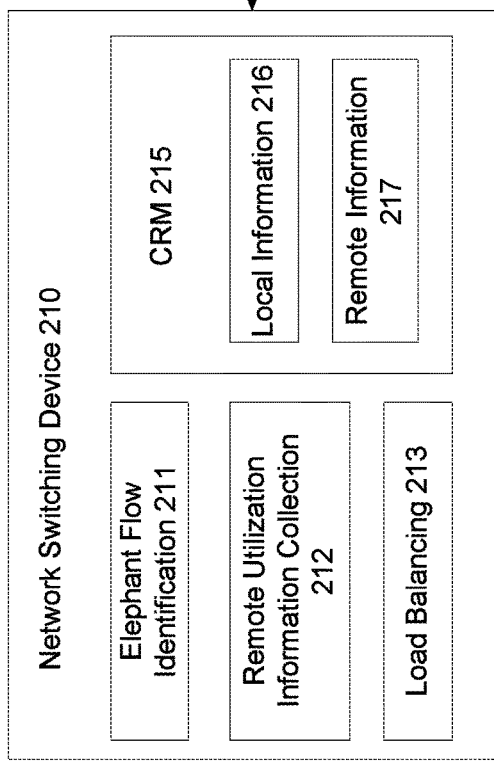
FIG. 2 illustrates an example environment with a network switching device configured to load balance network traffic, according to an example.
Figure 2:
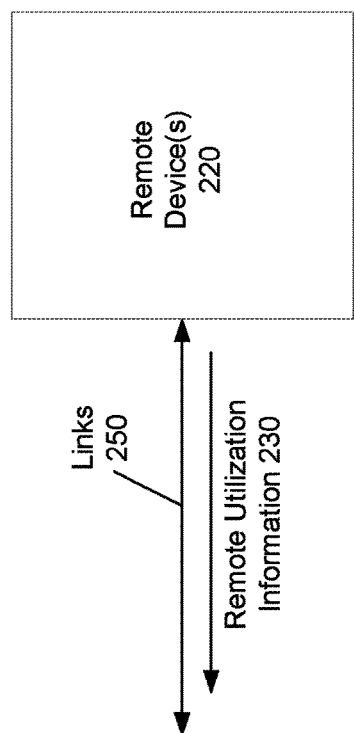
Figure 2:
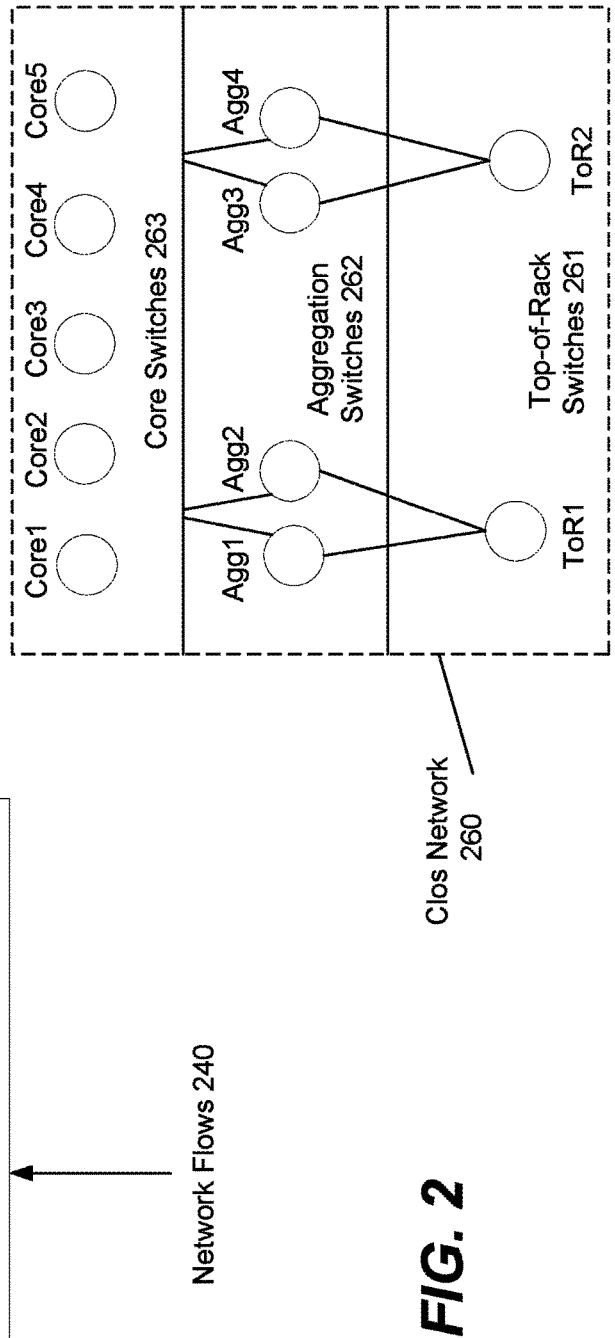

Methods 100 and 150 will be described here relative to environment 200 of FIG. 2. Environment 200 may include network switching device 210 and remote device(s) 220. These devices may be network infrastructure devices in a network, such as Ethernet switches and Internet Protocol routers and may be connected together via links 250. Links 250 may be connections via a physical medium between one or more ports of network switching device 210 to one or more ports of remote device(s) 220.

These network infrastructure devices (e.g., network switching device 210, remote device(s) 220) may be arranged according to a Clos network architecture 260, which is a multi-stage network hierarchy structure often used in data centers. In example Clos network 260, there are top-of-rack switches 261 (ToR1, ToR2, though there can be more), aggregation switches 262 (Agg1-Agg4, though there can be more), and core switches 263 (Core1-Core5, though there could be more). While links are shown between the individual top-of-rack switches 261 and their respectively connected aggregation switches 262, links are intentionally not shown between the aggregation switches 262 and core switches 263. Instead, for ease of illustration, links are depicted between the aggregation switches 262 and the core switch layer 263. It should be understood that the aggregation switches 262 have connections to one or more of the core switches 263.

If ToR1 is transmitting a network flow destined for ToR2, the flow will pass through the aggregation switch stage, the core switch stage, back through the aggregation switch stage, to ToR2. Accordingly, there are many potential paths the network flow can take through Clos network 260, since the flow need only pass through one switch each time through the layer (i.e., Agg1 or Agg2, then one of Core 1-5, then Agg3 or Agg4). Various layer 3 routing techniques may be used to determine which path to send a network flow on through such a network. For example, the equal-cost multipath protocol (ECMP) may be used to identify potential paths with seemingly equal costs. ECMP creates groups of these paths, such that any path in the group may be used to send the network flow to its destination. Network flows may be load balanced across the paths in these groups. Additionally, at layer 2, switch ports are often bundled together to create logical ports, such as using the link aggregation protocol (LAG). This may occur on the sending and receiving side between switches. Similar to ECMP, network flows can be load balanced across the ports within these bundles. For load balancing networks it is important that the utilization information is correlated with the correct paths and this can be achieved by several mechanisms when advertising utilization corresponding to the nodes and links in the routing topology database. Within Clos networks this utilization information can be compacted by using the symmetry of the network.

Network switching device 210 may include an elephant flow identification block 211 to identify which flows of network flows 240 are elephant flows. Remote utilization information collection block 212 may collect remote utilization information 230 received from remote device(s) 220. Load balancing block 213 may load balance the network flows 240 across the ports of network switching device 210 according to a load balancing technique. Network switching device 210 may also include a computer readable medium to store local information 216, which can be local link utilization information, and remote information 217, which can be remote utilization information 230.

Network switching device 210 and remote devices(s) 220 may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, network switching device 210 and remote devices(s) 220 may include one or more machine-readable storage media separate from the one or more processing resources, as well as additional hardware elements, such as TCAMs and ASICs.

Turning to FIG. 1(a), method 100 may be used to load balance network traffic flows across ports of network switching device 210, according to an example. At 101, network switching device 210 may identify a network flow of network flows 240 as an elephant flow. A network flow is a flow of data packets related to the same workload. For example, data packets pertaining to a workload being performed by a server in a data center and communicated to a computer outside the data center may constitute a network flow. There may be many separate network flows transmitting through any given network switching device in a data center network.

Network flows may vary widely in size. For example, some network flows may be smaller than 10 KB while other network flows may be larger than 10 MB. Smaller network flows are referred to herein as "mice flows" while relatively larger network flows are referred to herein as "elephant flows". In some data center networks, elephant flows can constitute the bulk of the data bytes transferred through the network (e.g., 90%) while constituting just a small portion of the total number of flows in the network (e.g., 10%).

Elephant flows may be identified by tracking within network switching device 210 the number of bytes received for a given flow. For example, multiple counters or meters may be appointed, each for counting the number of bytes received for a given flow. The meters may track the number of bytes received over a given time period. In another example, if counters are used, the counters may be managed to account for the passage of time, such as by resetting or decrementing a counter for a given flow if no packets have been received within a specified period of time. This can ensure that short bursts of activity spread out over a long period of time do not result in a network flow being classified as an elephant flow.

When a packet in a flow is received at a receive port of network switching device 210, certain fields of the received packet (e.g., MAC destination address, MAC source address, IP destination address, IP source address, protocol, source port, destination port, ingress port, etc.) may be hashed into a counter table that indexes all of the appointed counters. The counter for the matching table entry may then be incremented by the number of bytes in the packet. When the counter reaches or surpasses a threshold value, the matching network flow may then be considered to be an elephant flow.

The threshold value may be configurable, such as by a network administrator via a network management interface. In another example, the threshold may be reconfigured in an automated manner. For example, the network switching device 210 may track how many active elephant flows have been identified (e.g., via a table listing active elephant flows) and may automatically alter the threshold if determined that there are too many active elephant flows. Similarly, the threshold could be automatically decreased if not enough active elephant flows exist. For example, if too many flows are being labeled elephant flows, the threshold value may be increased so as to reach a more desirable number of identified elephant flows. For instance, the threshold value may be initially set as 10 MB. But if greater than 25% of flows are reaching this threshold value and are being labeled elephant flows, the threshold value may be increased, such as to 20 MB. This could result in fewer flows being classified as elephant flows.

In another example, an elephant flow can be identified by parsing one or more packet fields of a packet in the flow. For instance, certain transport layer protocol ports may be known to be generally associated with elephant flows. Accordingly, if determined that the Transport Control Protocol (TCP)/User Datagram Protocol (UDP) port of the flow is one of these ports generally associated with elephant flows, the flow can be classified as an elephant flow. Accordingly, instead of tracking the size of the flow, method 100 can parse the TCP/UDP packet field of packets in the flow to determine whether the flow comes from one of these elephant flow ports. Other packets fields may be leveraged in a similar manner if the value of the packet field has bearing on whether the flow may be an elephant flow. To guard against false positives, the size of the flow may be monitored after identification of the flow as an elephant flow in this manner, so that if the flow is not big enough it can be reclassified as not an elephant flow. For instance, elephant flow module 302 of FIG. 3, as described later, may be used to perform such monitoring.

In another example, if the network is a software defined network (SDN), a flow can be identified as an elephant flow by an SDN controller in the network (or by an SDN application running on the SDN controller). For example, the SDN controller or SDN application can have prior knowledge of the network flow and its expected size, and thus can determine in advance that the flow will be an elephant flow. The SDN controller/application can thus communicate this to the network switching device 210.

At 102, in response to identifying a flow as an elephant flow, network switching device 210 may collect remote utilization information 230 for the flow. Remote utilization information may be port utilization information or port status information relating to the remote device 220 associated with the flow. In other words, this is the remote device 220 that is the next hop (e.g., directly or indirectly, according to a Clos architecture) for the flow. Port utilization information of the remote device 220 is useful for network switching device 210 because device 210 can then make a load balancing decision with respect to the flow that takes into account the status (e.g., up or down) and utilization (e.g., congestion, available bandwidth) of the ports of the remote device 220 in addition to the local utilization information, instead of making a decision that is blind to how the receiving device (i.e., remote device 220) is handling the packets being sent its way.

In collecting remote utilization information, the remote utilization information may be used not just for a single flow but for multiple flows that are transferred from the network switching device 210 to remote device 220. Put another way, the remote utilization information of remote device 220 can be relevant to multiple flows since multiple flows may be transferred between the two devices (via the multiple links between the devices), and thus utilization information of remote device's 210 port status and utilization information is relevant. Thus, upon receiving remote utilization information, it can be determined which flows the remote utilization information is relevant to and one or more of the flows may be load balanced based on such information.

Remote device 220 may record utilization information of its ingress ports in any suitable manner, such as using counters/meters. This recorded information may then be available to send to network switching device 210. In some examples, remote device 220 may not begin recording utilization information for a given flow until it is asked to do so by network switching device 210. For instance, network switching device 210 may send a packet to remote device 220 identifying the flow classified as an elephant flow. This packet may serve as a request/instruction to remote device 220 to begin recording utilization information related to this flow and to send periodic update of this information to network switching device 210. This information may be provided to network switching device 210 as part of remote utilization information 230. Network switching device 210 may record all remote utilization information in CRM 215 as remote information 217. Network switching device may also measure local utilization information (e.g., transmit port utilization information) using counters/meters on the ports and record this information in CRM 215 as local information 216.

At 103, network switching device 210 may recompute a path (e.g., link, next-hop device) for the flow based on the local information 216 and the remote information 217.

For either a LAG scenario or an ECMP scenario, network switching device 210 can maintain a load balancing table. This table can have entries for each LAG or ECMP group. A LAG or ECMP group is a group of logical or physical links between the network switching device 210 and the remote device 220. Any of the links in the group may be used to send packets of the network flow from network switching device 210 to remote device 220. However, the various flows traveling between these two devices are load balanced across the links to achieve better link utilization and avoid any single link from being overloaded. After a load balancing session, the packets for a given flow travel along the same link until the next load balancing session. This is to preserve intra-flow packet order. The way this is achieved is a received packet of a flow is hashed (e.g., using a combination of packet fields) into the load balancing table. The matching entry in the load balancing table then references an entry (also referred to as a "bin") in an indirection table. The particular bin then refers to the link in the LAG or ECMP group that is to be used for that particular flow. In this way, received packets for the flow will be matched to the same link. Note that the number of links should be less than or equal to the number of bins. Where there are more bins than links, multiple bins may refer to a single link. In this way, packets of different flows (each matching a different bin) may use the same link.

During the next load balancing session, a new link may be selected to match to a given bin in the indirection table. The new link may be selected to achieve a better balance of packet traffic over the links within the given LAG or ECMP group. Referring specifically to block 103 of method 100, in this case the load balancing decision may be made based not only on local information corresponding to port utilization and status of network switching device 210, but also based on remote link information corresponding to port utilization and status of remote device 220. The load balancing decision thus correlates the link utilizations of network switching device 210 and the remote device 220. Accordingly, network switching device 210 is able to make a load balancing decision for the elephant flows (those flows that most impact the network) that takes into account status and utilization of other devices in the network (those devices receiving the elephant flows and thus being impacted by them). Additionally, the load balancing decision may also take into account available bandwidth of the links. Thus, for example, just because a link is being used more than other links, if there is still significant bandwidth available (e.g., 50%) on that link, the load balancing algorithm may not choose a different link for the flow. As another example, network switching device 210 may also be configured to only change the path/link in the load balancing table for a certain number or proportion of flows within a certain time window. These features can help to ensure that flows aren't moved across links too often simply for marginal improvement in link utilization.

Load balancing sessions may be conducted in accordance with different timing schemes. In a simple example, load balancing may be performed for every new packet so as to select the optimal link at any given moment. However, this can create significant overhead and also may cause the order of packets within a flow to be altered, since different links may have different transmission speed and latency due to various reasons. Load balancing can also be performed on a flow by flow basis, but such a method may result in certain links being overloaded with elephant flows while other links have only mouse flows and so have lower utilization. Another scheme is to conduct a load balance session along "flowlet" boundaries. Within a particular flow, a flowlet is a burst of packets separated by an idle period. Flowlets exist in most flows and can be the result of the burstiness of TCP, which is the dominant transport layer protocol in the Internet Protocol suite. Thus, by detecting flowlet boundaries, one can rebalance at these boundaries (i.e., during the idle time) with a lower likelihood of affecting intra-flow packet order. Accordingly, in an example, method 100 recomputes the path for a given flow at flowlet boundaries of the flow.

In a stacking scenario, it may be desirable to keep traffic on LAG and ECMP links local to a particular chassis. This is because otherwise the inter-chassis link may become overloaded and become a bottleneck. Accordingly, when selecting a link during rebalancing, links in other chassis' within the stack may be ignored. If no local LAG or ECMP links exists, then a default load balancing technique may be used, which may select among the other chassis' links.

At 104, network switching device 210 may send the flow along the recomputed path. For example, upon receiving a new packet of the flow, network switching device 210 may hash the packet's fields into the load balancing table, which refers to a bin in the indirection table, which refers to the appropriate link to use. Network switching device 210 may then send the packet along that link, and may continue to send packets of the flow along that link until the next load balancing opportunity, at which point the preferred link may change.

In FIG. 1(b), method 150 may be used to load balance network traffic flows across ports of network switching device 210, according to an example. Blocks 151-154 are similar to blocks 101-104 of method 100. At 155, network switching device 210 refrains from collecting remote utilization information for a second network flow if the second flow is not identified as an elephant flow. For example, refraining from collecting remote utilization information may mean simply not requesting such information from the remote device 220. Alternatively, refraining from collecting remote utilization information may mean ignoring such information if available (for example, if it was sent by remote device 220 as relating to another flow that is classified as an elephant flow), and thus not recording it for the second network flow. In this way, network switching device 210 and remote device 220 do not incur the overhead of having to collect such information. At 156, network switching device 210 recomputes a second path for the second flow based on local utilization information (e.g., local egress port status and utilization information) but not based on remote utilization information. At 156, the network switching device 210 sends the second flow along the recomputed second path.

Figure 3:
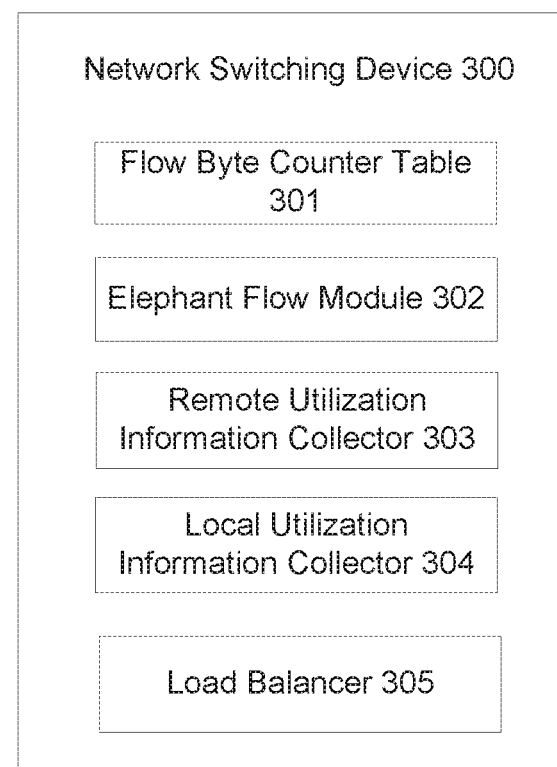
FIG. 3 illustrates an example network switching device configured to load balance network traffic, according to an example.

FIG. 3 illustrates an example network switching device 300 configured to load balance network traffic, according to an example. Network switching device 300 may implement ECMP and/or LAG.

Network switching device 300 may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, network switching device 300 may include one or more machine-readable storage media separate from the one or more processing resources, as well as additional hardware elements, such as TCAMs and ASICs.

Network switching device 300 may include multiple components and may perform methods 100 and 150. The description of methods 100 and 150 can be referred to for additional detail. Flow byte counter table 301 may count bytes passing through the network switching device on a per-flow basis. Flow byte counter table 301 may do this by indexing received packets in flows into individual counters based on a hash of packet fields. When a flow passes a certain number of bytes, it may be classified as an elephant flow. Elephant flow module 302 may monitor the elephant flow. In particular, elephant flow module 302 may verify that a flow that passed the threshold number of bytes is actually an elephant flow. Elephant flow module 302 can do this by tracking packets received for the flow over time. If the flow is not sufficient in size over a given period of time (the size and period of time may be configurable threshold values), the elephant flow module 302 may take action to cause network switching device 300 to not treat the flow and an elephant flow. For example, remote utilization information collector may be instructed to stop collecting remote utilization information for the flow.

Where a flow is determined to be an elephant flow, remote utilization information collector 303 may initiate collection of remote information from a remote device (e.g., remote device 220). Local utilization information collector 304 may collect local utilization information within network switching device 300 (e.g., egress port status and utilization information). Load balancer 305 may load balance the network flows over the available links of network switching device 300, such as described with respect to methods 100 and 150. In particular, load balancer 305 may apply a default load balancing technique to network flows not classified as elephant flows. For example, the default load balancing technique may make a load balancing decision based on local utilization information but not remote utilization information. For elephant flows, load balancer 305 recomputes a path for the elephant flow based on both local utilization information and remote utilization information. Additionally, load balancer may consider the available bandwidth of links when recomputing a path. Load balancer 305 may recompute the path for a flow upon detecting a flowlet boundary of the flow.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, this specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. In a network switching device, a method to load balance network traffic flows across links of the device, the method comprising, by a processing resource:
   identifying a flow of the network traffic flows as an elephant flow;
   in response to identifying the flow as an elephant flow, collecting remote utilization information for the flow, wherein the remote utilization information for the flow is received from a second device remote from the network switching device;
   recomputing a path for the flow based on local utilization information and the collected remote utilization information; and
   sending the flow along the recomputed path.

2. The method of claim 1, wherein an elephant flow is a network traffic flow with a size larger than a threshold.

3. The method of claim 2, wherein size of the network traffic flows is tracked using byte meters or counters.

4. The method of claim 2, wherein the threshold is configurable via an interface.

5. The method of claim 1, wherein the path is recomputed for the flow upon detecting a flowlet boundary in the flow.

6. The method of claim 1, wherein the second device is a downstream switch receiving the flow from the network switching device.

7. The method of claim 1, further comprising refraining from collecting remote utilization information for a second flow of the network traffic flows if the second flow is not identified as an elephant flow.

8. The method of claim 7, further comprising:
   recomputing a second path for the second flow based on local utilization information; and
   sending the second flow along the recomputed second path.

9. The method of claim 1, wherein the flow is identified as an elephant flow based on information received from a software defined network controller.

10. The method of claim 1, wherein the flow is identified as an elephant flow by parsing a transport layer protocol packet field of the flow to determine whether the flow comes from a port known to send elephant flows.

11. A network switching device, comprising:
    one or more processing resources;
    a memory storing instruction which, when executed by the one or more processing resources, cause the one or more processing resources to:
       identify a flow of the network traffic flows as an elephant flow;
       in response to identifying the flow as an elephant flow, collect remote utilization information for the flow, wherein the remote utilization information for the flow is received from a second device remote from the network switching device;
       recompute a path for the flow based on local utilization information and the collected remote utilization information; and
       send the flow along the recomputed path.

12. The device of claim 11, the instruction further causing the one or more processing resources to:
    count bytes passing through the network switching device on a per flow basis, wherein a particular flow is identified as an elephant flow when a number of bytes surpasses a threshold number of bytes;
    wherein bytes passing through the network switching device are counted on a per-flow basis by indexing received flows into individual counters based on a hash of packet fields.

13. The device of claim 11, wherein the local utilization information comprises utilization information of the links of the network switching device associated with the flow and the remote utilization information comprises utilization information of links of the second device associated with the flow.

14. The device of claim 12, wherein the instructions further causing the one or more processing resources to: recompute a path of a second flow that does not surpass the threshold number of bytes using a different load balancing technique that does not consider remote utilization information.

15. The device of claim 12, the instructions further causing the one or more processing resources to:
send a packet the second device requesting that the second device provide remote utilization information to the network switching device when the flow passes the threshold number of bytes.

16. The device of claim 12, the instructions further causing the one or more processing resources to:
determine whether activity of the flow drops below a second threshold; and
in response to the activity dropping below the second threshold, stop collecting remote utilization information for the flow and use a different load balancing technique for the flow.

17. The device of claim 14, the instructions further causing the one or more processing resources to:
to recompute the path for the flow based additionally on available bandwidth of links of the network switching device.

18. The device of claim 14, the instructions further causing the one or more processing resources to:
apply a default load balancing technique on the flow prior to the flow being monitored by the elephant flow module.

19. The device of claim 12, the instructions further causing the one or more processing resources to:
count bytes of flows relating to unicast traffic but not of flows relating to multicast traffic.

* * * * *